(12) United States Patent
Jiang et al.

(10) Patent No.: US 8,370,046 B2
(45) Date of Patent: Feb. 5, 2013

(54) SYSTEM AND METHOD FOR MONITORING A GAS TURBINE

(75) Inventors: Xiaomo Jiang, Greenville, SC (US);
Michael Edward Bernard, Greenville, SC (US); Sameer Vittal, Smyrna, GA (US)

(73) Assignee: General Electric Company, Schenectady, NY (US)

( * ) Notice: Subject to any disclaimer, the term of this patent is extended or adjusted under 35 U.S.C. 154(b) by 323 days.

(21) Appl. No.: 12/704,031

(22) Filed: Feb. 11, 2010

(65) Prior Publication Data
US 2011/0196593 A1 Aug. 11, 2011

(51) Int. Cl.
*G06F 19/00* (2006.01)

(52) U.S. Cl. ...... 701/100; 701/31.6; 701/31.7; 702/182; 702/183; 702/184; 60/39.091; 73/112.01

(58) Field of Classification Search ............... 701/100, 701/31.7, 31.6; 60/39.091; 73/112.01; 705/4, 705/35, 7.28; 415/55.7, 55.1; 422/220, 600, 422/6, 600.6; 702/182–184

See application file for complete search history.

(56) References Cited

U.S. PATENT DOCUMENTS

| | | | |
|---|---|---|---|
| 6,192,325 B1 | 2/2001 | Piety et al. | |
| 6,263,737 B1 | 7/2001 | Schoess | |
| 6,404,923 B1 | 6/2002 | Chaddha | |
| 6,411,908 B1 | 6/2002 | Talbot | |
| 6,438,484 B1 * | 8/2002 | Andrew et al. | 701/100 |
| 6,579,005 B2 | 6/2003 | Ingallinera | |
| 6,596,171 B2 | 7/2003 | Unger | |
| 6,636,814 B1 | 10/2003 | McCullers | |
| 6,697,747 B2 | 2/2004 | Smith | |
| 6,809,506 B2 | 10/2004 | Thomas, III et al. | |
| 6,853,951 B2 | 2/2005 | Jarrell et al. | |
| 6,892,358 B2 | 5/2005 | Draghetti | |

(Continued)

FOREIGN PATENT DOCUMENTS

| | | |
|---|---|---|
| CA | 2369194 | 7/2002 |
| CA | 2390162 | 4/2007 |

(Continued)

OTHER PUBLICATIONS

The maintenance schedule optimization in an interconnected power system using the levelized risk method; Kurban, M.; Electric Power Engineering, 1999. PowerTech Budapest 99. International Conference on; Digital Object Identifier: 10.1109/PTC.1999.826695; Publication Year: 1999.*

(Continued)

*Primary Examiner* — Coung H Nguyen
(74) *Attorney, Agent, or Firm* — Dority & Manning, P.A.

(57) ABSTRACT

A system for monitoring a gas turbine includes a memory containing information from comparable gas turbines and an input device that generates a unit data signal and a risk signal. A processor in communication with the memory and the input device incorporates the unit data signal into the database, projects information for the gas turbine, and calculates a conditional risk that the gas turbine will reach a limit. An output signal includes repair or maintenance schedules. A method for monitoring a gas turbine includes receiving information from comparable gas turbines, adding information from the gas turbine to the information from comparable gas turbines, and projecting information for the gas turbine. The method further includes calculating a conditional risk that the gas turbine will reach a limit and generating an output signal containing repair or maintenance schedules.

20 Claims, 7 Drawing Sheets

U.S. PATENT DOCUMENTS

| | | | |
|---|---|---|---|
| 7,085,721 | B1 | 8/2006 | Kawahara et al. |
| 7,127,373 | B2 | 10/2006 | House et al. |
| 7,130,779 | B2 | 10/2006 | Beverina et al. |
| 7,231,327 | B1 | 6/2007 | Beverina et al. |
| 7,254,521 | B2 | 8/2007 | Dauss et al. |
| 7,260,501 | B2 | 8/2007 | Pattipatti et al. |
| 7,286,960 | B2 | 10/2007 | Jammu et al. |
| 7,308,388 | B2 | 12/2007 | Beverina et al. |
| 7,333,917 | B2 | 2/2008 | Greis et al. |
| 7,369,062 | B2 | 5/2008 | Stokes et al. |
| 7,424,403 | B2 | 9/2008 | Robinson et al. |
| 7,430,534 | B2 * | 9/2008 | Lof et al. .................. 705/37 |
| 7,433,789 | B1 | 10/2008 | Balestra |
| 7,461,042 | B2 | 12/2008 | Long et al. |
| 7,533,149 | B2 | 5/2009 | Starbuck et al. |
| 7,536,277 | B2 | 5/2009 | Pattipatti et al. |
| 8,010,392 | B2 * | 8/2011 | Mueller et al. ............... 705/4 |
| 8,185,291 | B2 * | 5/2012 | Nakakita et al. ............ 701/100 |
| 2002/0045952 | A1 | 4/2002 | Blemel |
| 2002/0122458 | A1 | 9/2002 | Ingallinera |
| 2002/0144551 | A1 | 10/2002 | Satsangi |
| 2003/0074244 | A1 * | 4/2003 | Braxton ..................... 705/7 |
| 2005/0049753 | A1 | 3/2005 | Garcia-Ortiz |
| 2005/0273184 | A1 | 12/2005 | Dauss et al. |
| 2006/0064291 | A1 | 3/2006 | Pattipatti et al. |
| 2006/0195391 | A1 | 8/2006 | Stanelle |
| 2007/0177982 | A1 | 8/2007 | Cadet et al. |
| 2007/0234730 | A1 | 10/2007 | Markham et al. |
| 2008/0004840 | A1 | 1/2008 | Pattipatti et al. |
| 2008/0006379 | A1 | 1/2008 | Regan et al. |
| 2008/0133178 | A1 * | 6/2008 | Byrne et al. ............... 702/184 |
| 2008/0201139 | A1 | 8/2008 | Yu et al. |
| 2008/0217471 | A1 | 9/2008 | Liu et al. |
| 2008/0269922 | A1 | 10/2008 | Tesar |
| 2009/0083059 | A1 * | 3/2009 | Mueller et al. ............... 705/1 |
| 2011/0106680 | A1 * | 5/2011 | Vittal et al. ................. 705/35 |
| 2011/0196593 | A1 * | 8/2011 | Jiang et al. ................ 701/100 |
| 2011/0296810 | A1 * | 12/2011 | Hardwicke et al. ........ 60/39.091 |

FOREIGN PATENT DOCUMENTS

| | | | |
|---|---|---|---|
| CN | 101188355 | | 5/2008 |
| DE | 10235794 | | 3/2004 |
| EP | 1227382 | | 3/2003 |
| EP | 1227222 | | 1/2004 |
| EP | 1527402 | | 4/2007 |
| EP | 1967929 | | 9/2008 |
| JP | 2006-140257 | * | 5/2006 |
| KR | 20020062845 | | 7/2002 |
| MX | 02004434 | | 9/2002 |
| TW | 0514612 | | 12/2002 |
| WO | WO 9737327 | | 10/1997 |
| WO | WO 9738292 | | 10/1997 |
| WO | WO 0134446 | | 5/2001 |
| WO | WO 0140984 | | 6/2001 |
| WO | WO 2004017235 | | 2/2004 |
| WO | WO 2005017288 | | 2/2005 |
| WO | WO2007/009268 | * | 1/2007 |
| WO | PCT/JP2007/060230 | * | 11/2007 |
| WO | WO2007/135991 | * | 11/2007 |
| WO | WO 2007146424 | | 12/2007 |

OTHER PUBLICATIONS

Selective Maintenance Schedule of Distribution Networks Based on Risk Management Approach; Janjic, A.D.; Popovic, D.S.; Power Systems, IEEE Transactions on; vol. 22, Issue: 2; Digital Object Identifier: 10.1109/TPWRS.2007.894863 Publication Year: 2007, pp. 597-604.*

Forecasting gas turbine Exhaust Gas Temperatures using Support Vector Machine Experts and Genetic Algorithm; Yukitomo, A.R.; Syrmos, V.L.; Control & Automation (MED), 2010 18th Mediterranean Conference on; Digital Object Identifier: 10.1109/MED.2010.5547692; Publication Year: 2010, pp. 345-350.*

The strategy for the maintenance scheduling of the generating units; Basaran, U.; Kurban, M.; Power Engineering, 2003 Large Engineering Systems Conference on; Digital Object Identifier: 10.1109/LESCPE.2003.1204699; Publication Year: 2003, pp. 172-176.*

Reliability evaluation of stand-alone hybrid microgrid using Sequential Monte Carlo Simulation; Ghahderijani, M.M. et al., Renewable Energy and Distributed Generation (ICREDG), 2012 Second Iranian Conf. on; Communication, Networking & Broadcasting; Systems; Power, Energy, & Industry Applications; Pub. Yr. 2012, pp. 33-38.*

Emissions reduction and risk management in the assessment of energy reserve in the presence of wind generation plants Menniti, D. et al., Power Electronics, Electrical Drives, Automation and Motion, 2008. SPEEDAM 2008. International Symposium on; Publication Year: 2008, pp. 1475-1480.*

Monte-Carlo optimization framework for assessing electricity generation portfolios; Vithayasrichareon, P.; MacGill, I.; Fushuan Wen Power Engineering Conference, 2009. AUPEC 2009. Australasian Universities; Topic(s): Power, Energy, & Industry Applications; Publication Year: 2009, pp. 1-6.*

SSR risk alleviation in dual-rotor wind turbine by employing genetic solutions; Farahani, E.M.; Hosseinzadeh, N.; Ektesabi, M.M. Universities Power Engineering Conference (AUPEC), 2011 21st Australasian; Topic(s): Components, Circuits, Devices & Systems; Power, Energy, & Industry Applications; Transportation; Pub. Year: 2011, pp. 1-7.*

Feasibility of using wind turbines to provide reactive compensation for voltage improvement on an electric utility Ring Sharma, C.; Ramsaran, A.; Transmission and Distribution Conference and Exposition: Latin America (T&D-LA), 2010 IEEE/PES; Digital Object Identifier: 10.1109/TDC-LA.2010.5762984; Publication Year: 2010, pp. 853-859.*

Wind power simulation model for reliability evaluation; Karki, R.; Po Hu; Electrical and Computer Engineering, 2005. Canadian Conference on; Digital Object Identifier: 10.1109/CCECE.2005.1556988; Publication Year: 2005, pp. 541-544.*

Effects of seasonality and locality on the operating capacity benefits of wind power; Karki, B.; Billinton, R.; Electrical Power & Energy Conference (EPEC), 2009 IEEE; Topic(s): Power, Energy, & Industry Applications Digital Object Identifier: 10.1109/EPEC.2009.5420868; Publication Year: 2009, pp. 1-6.*

The calculating PHM cluster: CH&P mathematical models and algorithms of early prognosis of failure; Kirillov, A.; Kirillov, S.; Pecht, M.Prognostics and System Health Management (PHM), 2012 IEEE Conference on; Digital Object Identifier: 10.1109/PHM.2012.6228771; Publication Year: 2012, pp. 1-11.*

* cited by examiner

SYSTEM AND METHOD FOR MONITORING A GAS TURBINE

FIELD OF THE INVENTION

The present invention generally involves a system and method for monitoring the health of a gas turbine. More specifically, the present invention describes a system and method that adjusts a generic gas turbine model using actual information from an individual gas turbine to project repair and/or maintenance intervals of the individual gas turbine.

BACKGROUND OF THE INVENTION

Figure 1:
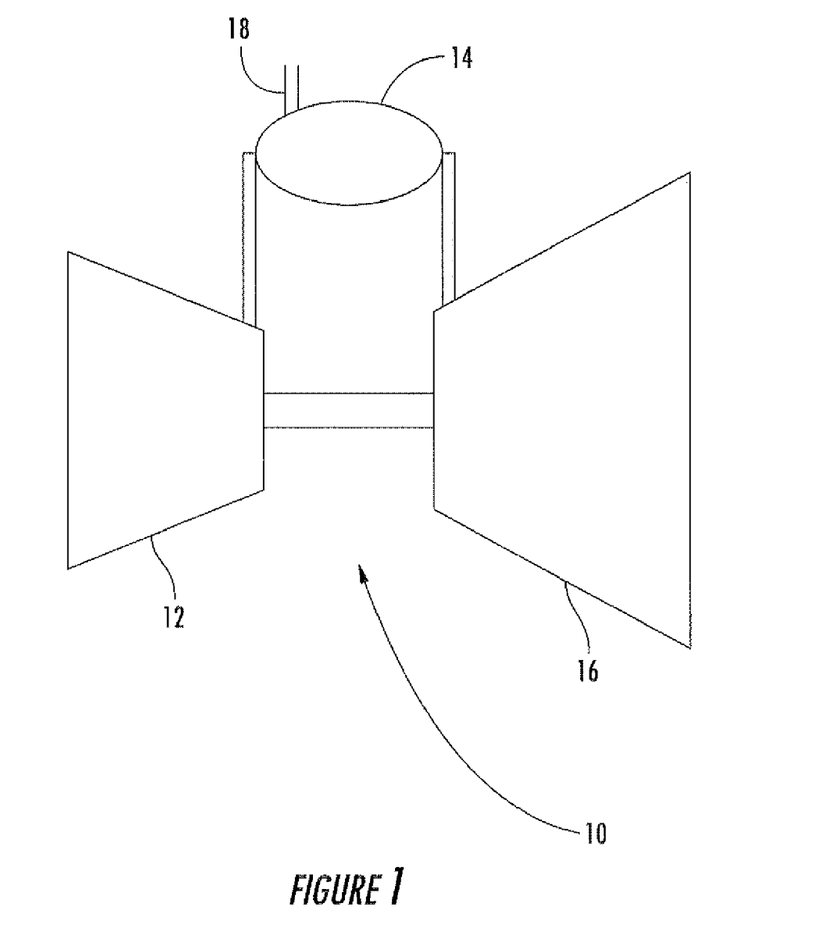
FIG. 1 shows a simplified block diagram of a typical gas turbine system.

Gas turbines are widely used in industrial and commercial operations. As shown in FIG. 1, a typical gas turbine 10 includes an axial compressor 12 at the front, one or more combustors 14 around the middle, and a turbine 16 at the rear. The compressor 12 includes multiple stages of rotating blades and stationary vanes. Ambient air enters the compressor 12, and the rotating blades and stationary vanes progressively impart kinetic energy to the working fluid (air) to bring it to a highly energized state. The working fluid exits the compressor 12 and flows to the combustors 14 where it mixes with fuel 18 and ignites to generate combustion gases having a high temperature, pressure, and velocity. The combustion gases exit the combustors 14 and flow to the turbine 16 where they expand to produce work.

Gas turbines, like any other mechanical device, require periodic repairs and maintenance to ensure proper operation. As a general approach, previous experiences with the "fleet" of gas turbines, particularly comparable gas turbines of similar class or type, may be statistically analyzed to develop a fleet model that can project the anticipated wear and damage experienced by other gas turbines. Based on the fleet model, projections, repairs, and maintenance can be scheduled at optimum intervals that minimize the risk of both unplanned shutdowns to effect repairs and also unnecessary shutdowns to perform unnecessary preventive maintenance.

The actual performance of individual gas turbines, however, may vary from the fleet model. For example, individual gas turbines may have slight differences in configuration, manufacturing tolerances, and assembly that can result in different levels of wear and damage compared to the fleet model. In addition, the operational, repair, and maintenance histories that individual gas turbines actually experience may differ from the fleet average. For example, gas turbines operated in humid and corrosive environments may require more frequent repairs and maintenance to address issues associated with corrosion, pitting, and emissions compared to the fleet model. Conversely, other gas turbines that experience fewer startups and shutdown cycles may require less frequent shutdowns to perform preventive maintenance associated with cyclical stresses compared to the fleet model. In each example, adjustments to the fleet model based on the actual data associated with individual gas turbines will enhance the ability to optimally schedule repairs and maintenance.

Therefore, an improved system and method for monitoring the performance and operation of a gas turbine would be desirable.

BRIEF DESCRIPTION OF THE INVENTION

Aspects and advantages of the invention are set forth below in the following description, or may be obvious from the description, or may be learned through practice of the invention.

One embodiment of the present invention is a system for monitoring the performance of a gas turbine under service. The system includes a first memory element containing a database of parameter information from comparable gas turbines and an input device, wherein the input device generates a unit data signal containing parameter information from the gas turbine under service and a risk signal containing a risk value for the gas turbine under service. A processor in communication with the first memory device and the input device incorporates the unit data signal into the database of parameter information from comparable gas turbines, projects parameter information for the gas turbine under service, and calculates a conditional risk that the projected parameter information for the gas turbine under service will reach a predetermined parameter limit. An output signal generated by the processor includes at least one of repair or maintenance scheduling information.

Another embodiment of the present invention is a method for monitoring the performance of a gas turbine under service. The method includes receiving parameter information from comparable gas turbines, adding parameter information from the gas turbine under service to the parameter information from comparable gas turbines, and projecting parameter information for the gas turbine under service. The method further includes calculating a conditional risk that the projected parameter information for the gas turbine under service will reach a predetermined parameter limit and generating an output signal containing at least one of a repair or a maintenance schedule for the gas turbine under service based on the conditional risk.

A still further embodiment of the present invention is a method for monitoring the performance of a gas turbine under service that includes receiving a fleet model signal containing parameter information from comparable gas turbines, adding parameter information from the gas turbine under service to the parameter information from comparable gas turbines, and projecting parameter information for the gas turbine under service. The method further includes calculating a conditional risk that the projected parameter information for the gas turbine under service will reach a predetermined parameter limit and generating an output signal containing at least one of a repair schedule, a maintenance schedule, or a projected useful life for the gas turbine under service based on the conditional risk.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

The systems and methods discussed herein makes reference to processors, servers, memories, databases, software applications, and/or other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among the components. For instance, computer-implemented processes discussed herein may be implemented using a single server or processor or multiple such elements working in combination. Databases and other memory/media elements and applications may be implemented on a single system or distributed across multiple systems. Distributed components may operate sequentially or in parallel. All such variations as will be understood by those of ordinary skill in the art are intended to come within the spirit and scope of the present subject matter.

When data is obtained or accessed between a first and second computer system, processing device, or component thereof, the actual data may travel between the systems directly or indirectly. For example, if a first computer accesses a file or data from a second computer, the access may involve one or more intermediary computers, proxies, or the like. The actual file or data may move between the computers, or one computer may provide a pointer or metafile that the second computer uses to access the actual data from a computer other than the first computer.

The various computer systems discussed herein are not limited to any particular hardware architecture or configuration. Embodiments of the methods and systems set forth herein may be implemented by one or more general-purpose or customized computing devices adapted in any suitable manner to provide desired functionality. The device(s) may be adapted to provide additional functionality, either complementary or unrelated to the present subject matter. For instance, one or more computing devices may be adapted to provide the described functionality by accessing software instructions rendered in a computer-readable form. When software is used, any suitable programming, scripting, or other type of language or combinations of languages may be used to implement the teachings contained herein. However, software need not be used exclusively, or at all. For example, as will be understood by those of ordinary skill in the art without required additional detailed discussion, some embodiments of the methods and systems set forth and disclosed herein may also be implemented by hard-wired logic or other circuitry, including, but not limited to application-specific circuits. Of course, various combinations of computer-executed software and hard-wired logic or other circuitry may be suitable, as well.

It is to be understood by those of ordinary skill in the art that embodiments of the methods disclosed herein may be executed by one or more suitable computing devices that render the device(s) operative to implement such methods. As noted above, such devices may access one or more computer-readable media that embody computer-readable instructions which, when executed by at least one computer, cause the at least one computer to implement one or more embodiments of the methods of the present subject matter. Any suitable computer-readable medium or media may be used to implement or practice the presently-disclosed subject matter, including, but not limited to, diskettes, drives, and other magnetic-based storage media, optical storage media, including disks (including CD-ROMS, DVD-ROMS, and variants thereof), flash, RAM, ROM, and other solid-state memory devices, and the like.

Condition based maintenance systems apply stochastic analyses of fleet models, unit specific data, and operator selected risk parameters to produce a cost-effective system and method of optimizing repair and/or maintenance intervals of high fidelity systems such as gas turbines. A fleet model for each specific failure mechanism for a gas turbine may be developed by applying multilevel stochastic modeling techniques, such as Bayesian inference and Markov Chain Monte Carlo (MCMC) simulation, to historical fleet data. The accuracy of each fleet model may be periodically verified and/or validated, and unit specific data obtained from a particular gas turbine may be added to each fleet model to adjust or update the fleet model or create a unit model that more accurately models the particular gas turbine for each specific failure mechanism. Applying operator selected risk parameters to the updated fleet model enhances the ability to schedule repair and/or maintenance items at optimum intervals that increase the operational availability, reduce unplanned and unnecessary shutdowns, and/or increase the useful life of the particular gas turbine.

As an example, if the unit specific data for the particular gas turbine indicates lower wear or damage compared to the projections provided by the fleet model, the availability of the particular gas turbine may be improved by extending the intervals between repair and/or maintenance events. Conversely, if the unit specific data for the particular gas turbine indicates greater wear or damage compared to the projections provided by the fleet model, the intervals between repair and/or maintenance events may be decreased, resulting in a planned outage rather than the more costly unplanned outage. In either event, the adjusted repair and/or maintenance schedule improves the reliability and operation of the particular gas turbine, resulting in a more accurate, and possibly extended, useful life for the particular gas turbine.

Figure 2:
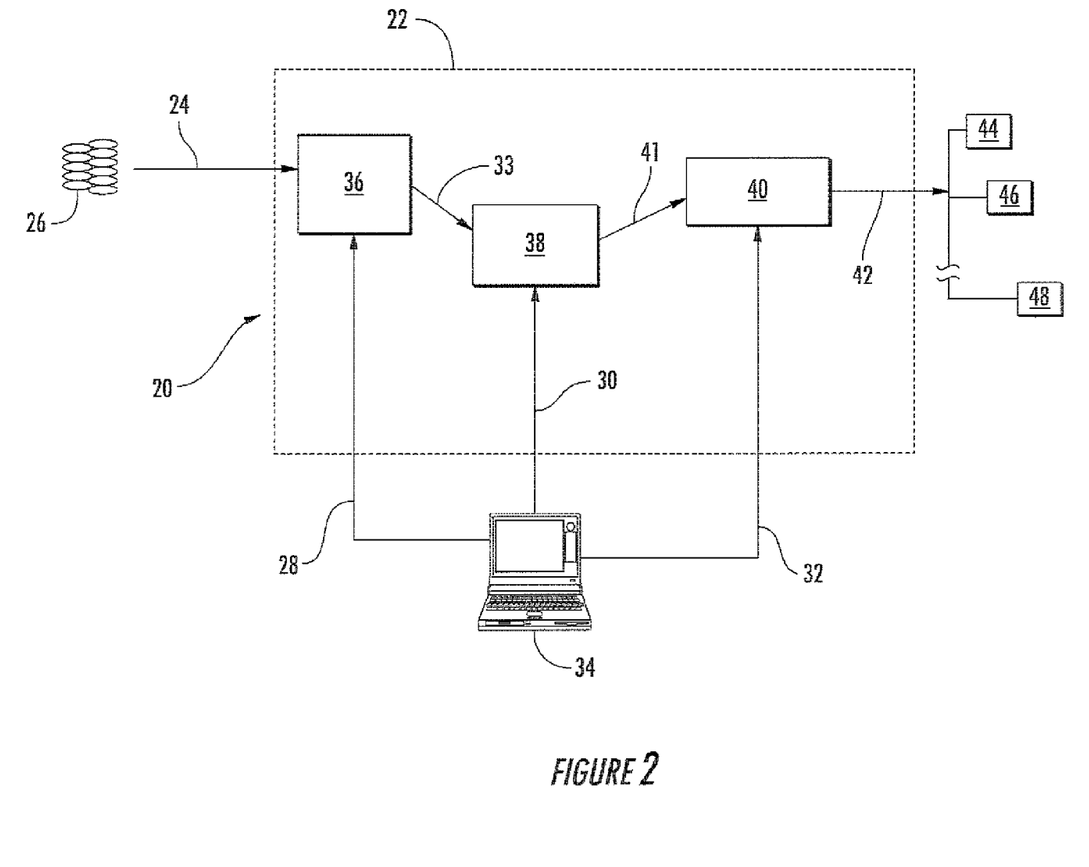
FIG. 2 shows a functional block diagram of a system for monitoring a gas turbine under service according to one embodiment of the present invention.

FIG. 2 shows a system 20 for monitoring a gas turbine under service 10 according to one embodiment of the present invention. The term "gas turbine under service" refers to a particular or specific gas turbine, as distinguished from the fleet of gas turbines. The system 20 generally includes a processor 22 that includes programming to access one or more memory/media elements. The processor 22 receives a fleet model signal 24 from a database 26 and a fleet data signal 28, a unit data signal 30, and/or a risk signal 32 from an input device 34. The term "signal" refers to any electrical transmission of information. The fleet model signal 24 comprises parameter information for comparable gas turbines projected by a fleet model included in the database 26. The system 20 applies multilevel stochastic modeling techniques, Bayesian inference, and MCMC simulation, represented by block 36 and the algorithm shown in FIG. 3, to verify and validate the projected parameter information included in the fleet model signal 24 and to generate an updated fleet model signal 33. The system 20 adds parameter information from the gas turbine under service 10 contained in the unit data signal 30 to the updated fleet model signal 33 to create an updated fleet model, preferably referred to as a unit model, represented by block 38 and the algorithm shown in FIG. 4. The unit model generates projected parameter information 41 for the gas turbine under service 10. A unit risk analysis, represented by block 40 in FIG. 2 and the algorithms shown in FIGS. 5 and 6, combines the projected parameter information 41 from the unit model with the risk signal 32 to generate an output signal 42 that reflects repair 44 and/or maintenance 46 schedules and/or a useful life projection 48 for the gas turbine under service 10.

The processor 22 discussed herein is not limited to any particular hardware architecture or configuration. Instead, the processor 22 may comprise a general-purpose or customized computing device adapted to provide the described functionality by accessing memory media (e.g., blocks 36, 38, and/or 40 in FIG. 2), databases, and other hardware as directed by software instructions rendered in a computer-readable form or programmed circuitry. For example, the processor 22 may comprise a single server, a single micro-processor, hard-wired logic, including, but not limited to, application-specific circuits, or multiple such elements working in combination.

The database 26 contains historical parameter information of the "fleet" of gas turbines, particularly comparable gas turbines of similar class or type, accumulated from available sources. The database 26 may include memory/media elements and applications implemented on a single system or distributed across multiple systems. If distributed components are used, they may operate sequentially or in parallel.

The historical parameter information contained in the database 16 includes data reflecting operation, repairs, and/or maintenance of the comparable gas turbines. The historical parameter information may specifically include data referred to as exposure data and damage data. Exposure data includes any information describing the operational history of a comparable gas turbine that can be statistically associated with predicting a failure mode or mechanism. For example, exposure data may include operating hours, number of start-up and shut-down cycles, firing temperatures, and number of unplanned trips. Damage data includes any hardware failure mechanisms that have occurred with a statistical significance. A failure mechanism includes any degradation in the physical or functional characteristics from the nominal values that results in a loss of output, loss of efficiency, or inability to operate the comparable gas turbine. Examples of known failure mechanisms include corrosion, creep, deformation, fatigue, foreign object damage, oxidation, thermal barrier coating (TBC) spallation, plugging/contamination, rupture, and wear. These failure mechanisms may be collected or recorded as a result of enhanced boroscope inspections, on-site monitoring, operating logs, repair logs, maintenance logs, and the like.

The available sources of historical information include, for example, databases of operating experiences, operating records, part inspection records, and field inspection reports. Examples of the historical information included in these sources include, but are not limited to, enhanced boroscope inspection (EBI) reports, electronic records, monitoring and diagnostics (M&D) data, records of outage events, operating hours, starts, and trips, and service shop or repair data.

The collection of the historical information, such as exposure and damage data, is statistically analyzed and normalized to develop the fleet model, also known as a data accumulation model. The fleet model projects parameter information such as the growth of damage during future exposures using the collected historical information, and the fleet model and/or the projected parameter information are communicated to the processor 22 through the fleet model signal 24.

The input device 34 allows a user to communicate with the system 20 and may include any structure for providing an interface between the user and the system 20. For example, the input device 34 may include a keyboard, computer, terminal, tape drive, and/or any other device for receiving input from a user and generating the fleet data signal 28, unit data signal 30, and/or risk signal 32 to the system 20.

Figure 3:
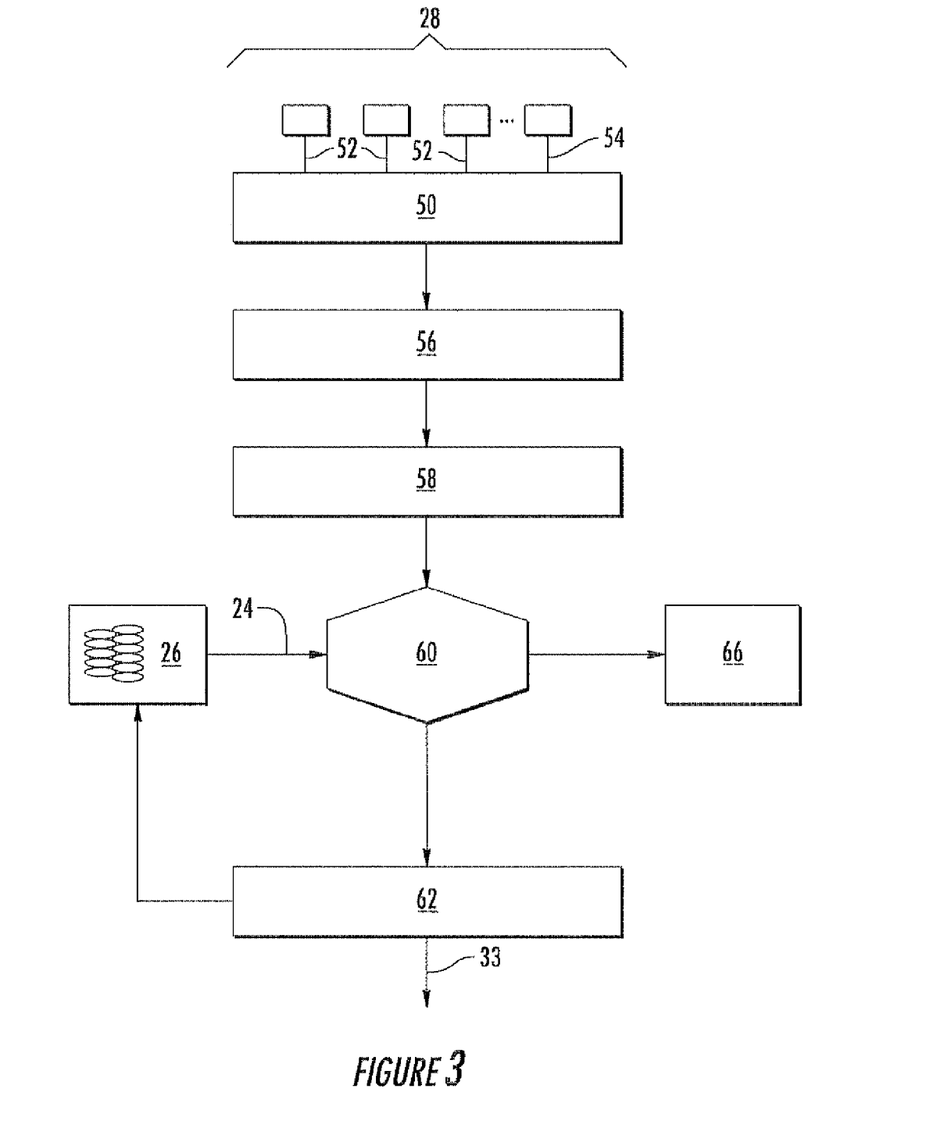
FIG. 3 shows an algorithm for updating and validating a fleet model.

FIG. 3 shows an algorithm for updating and validating the fleet model and/or fleet model signal 24, previously referred to as block 26 in FIG. 2. At block 50, the algorithm imports the fleet data signal 28 comprising, for example, newly collected parameter information from comparable gas turbines in the fleet, such as exposure data 52 and damage data 54. For illustration purposes only, assume that the fleet data signal 28 indicates that at 10,000 hours of operation, with 20 start-up and shut-down cycles, and 2 unplanned trips, horoscope inspections detected crack sizes of 0.1, 0.2, 0.1, 0.2, 0.3, and 0.2 in a particular component. At block 56, the algorithm sorts and organizes the imported exposure 52 and damage 54 data, for example, by assigning a variable $L_n$ to each inspection result in ascending order according to the magnitude of detected damage, to produce the following result: $L_1$=0.1, $L_2$=0.1, $L_3$=0.2, $L_4$=0.2, $L_5$=0.2, and $L_6$=0.3. At block 58, the algorithm groups the sorted exposure 52 and damage 54 data, for example, by assigning a variable $R_n$ to each inspection result having the same magnitude, to produce the following result: $R_1$=2/6, $R_2$=2/6, $R_3$=3/6, $R_4$=3/6, $R_5$=3/6, and $R_6$=1/6. At block 60, the algorithm compares the sorted and grouped data 52, 54 to the fleet model signal 24, which includes distribution parameter information such as the projected damage results based on the fleet model, to determine if the fleet model is statistically accurate. Statistical accuracy may be determined by any number of individual or combined statistical criteria, including, for example, the coefficient of determination ($R^2$) value or standard deviation ($\delta$). If the comparison indicates that the fleet model provides a statistically accurate projection of the actual damage, block 62, then the algorithm updates the database 26 of historical parameter information with the newly collected parameter information from comparable gas turbines in the fleet and provides the updated fleet model signal 33 for further analysis. The updated fleet model becomes the unit model when accessed by the algorithm shown in FIG. 4. If the comparison indicates that the fleet model does not provide a statistically accurate projection of the actual damage, then the algorithm generates a flag 66 or other signal indicating the need to investigate the error between the fleet model projections and the actual damage data.

Figure 4:
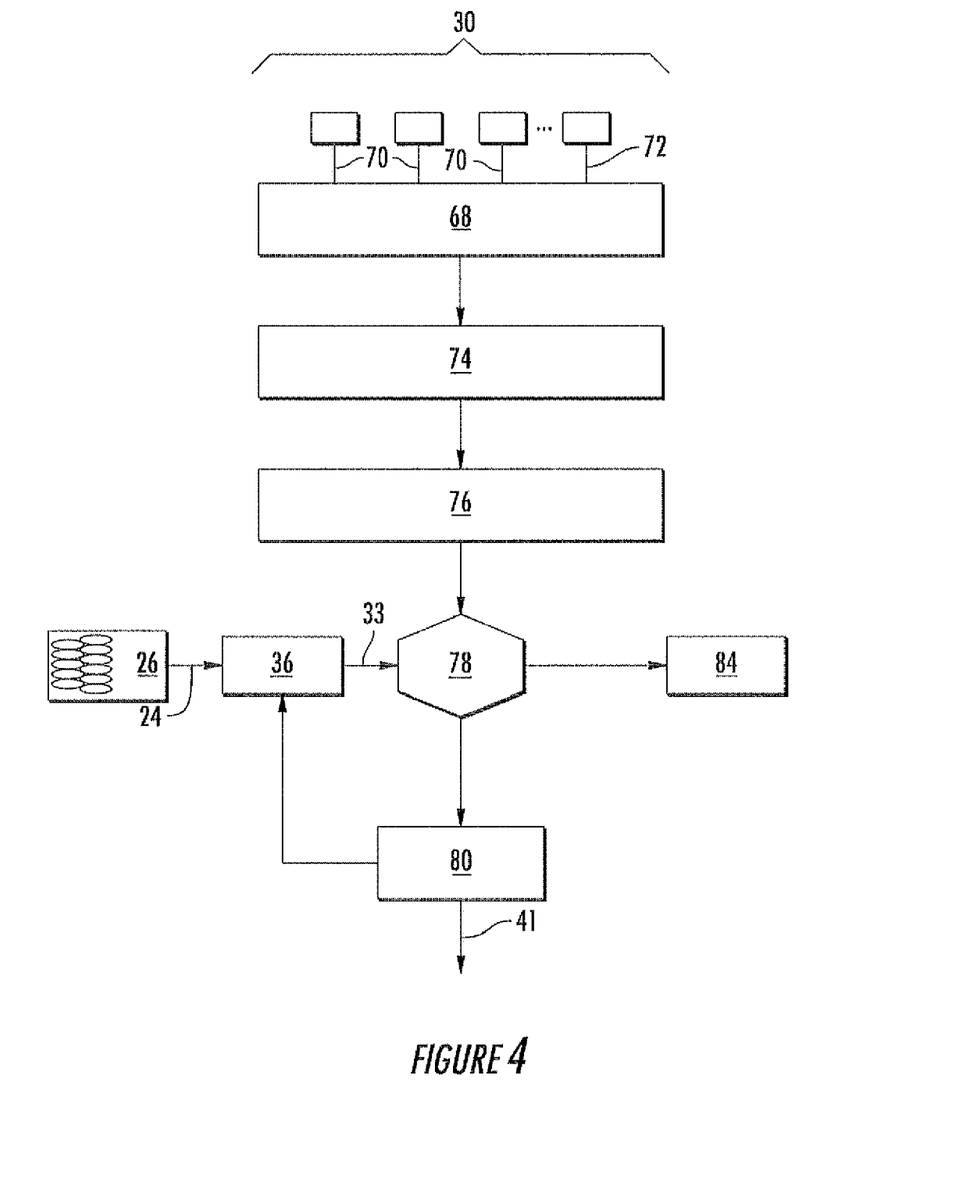
FIG. 4 shows an algorithm for updating and validating a unit model.

FIG. 4 shows an algorithm for updating and validating the unit model, previously referred to as block 38 in FIG. 2. At block 68, the algorithm imports the unit data signal 30 comprising, for example, newly collected parameter information from the gas turbine under service 10, such as exposure data 70 and damage data 72. For illustration purposes only, again assume that the unit data signal 30 indicates that at 10,000 hours of operation, with 20 start-up and shut-down cycles, and 2 unplanned trips, boroscope inspections detected crack sizes of 0.1, 0.3, 0.1, 0.3, 0.3, and 0.2 in a particular component. At block 74, the algorithm sorts and organizes the imported unit data 70, 72, for example, by assigning a variable $L_n$ to each inspection result in ascending order according to the magnitude of detected damage, to produce the following result: $L_1$=0.1, $L_2$=0.1, $L_3$=0.2, $L_4$=0.3, $L_5$=0.3, and $L_6$=0.3. At block 76, the algorithm groups the sorted unit data 70, 72, for example, by assigning a variable $R_a$ to each inspection result having the same magnitude, to produce the following result: $R_1$=2/6, $R_2$=2/6, $R_3$=1/6, $R_4$=3/6, $R_5$=3/6, and $R_6$=3/6. At block 78, the algorithm compares the sorted and grouped unit data 70, 72 to the unit model, which includes distribution parameter information such as the projected damage results based on the unit model, to determine if the unit model is statistically accurate. Statistical accuracy may be determined by any number of individual or combined statistical criteria, including, for example, the coefficient of determination ($R^2$) value or standard deviation ($\delta$). If the comparison indicates that the unit model provides a statistically accurate projection of the actual damage, block 80, then the algorithm updates the unit model with the newly collected parameter information from the gas turbine under service 10 and generates updated parameter information 41 from the unit model for further analysis. If the comparison indicates that the unit model does not provide a statistically accurate projection of the actual damage, then the algorithm generates a flag 84 or other signal indicating the need to investigate the error between the projections and actual damage.

Figure 5:
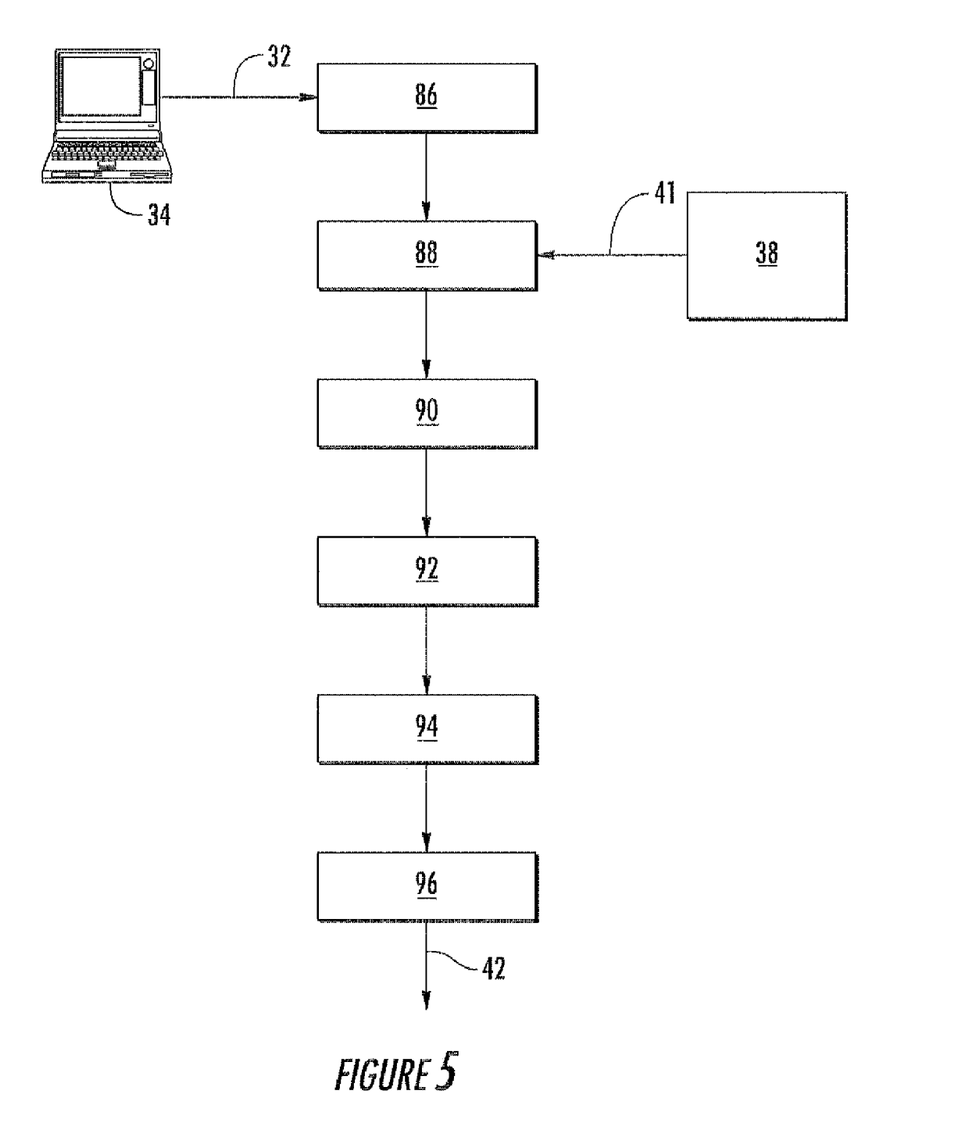
FIG. 5 shows an algorithm for performing a unit risk analysis.

FIG. 5 shows an algorithm for performing the unit risk analysis, previously referred to as block 40 in FIG. 2. The unit risk analysis combines the updated parameter information 41 from the unit model with the risk signal 32 to generate the output signal 42 that reflects the repair 44 and/or maintenance 46 schedules and/or useful life projection 48 for the gas turbine under service 10. At block 86, the algorithm imports the risk signal 32 comprising, for example, unit exposure data, acceptable risk levels for each failure mechanism, and/or the next inspection interval for the gas turbine under service 10. At block 88, the algorithm imports the updated parameter information 41 from the unit model comprising, for example, distribution unit parameter information such as the projected damage results based on the unit model. At block 90, the algorithm loads or accesses risk analysis equations corresponding to each failure mechanism. The risk analysis equations may employ any of various techniques known in the art for modeling the distribution curves of future conditions based on known data. For example, the risk analysis equations may use a Weibull-loglinear model, Weibull proportional hazard model, or lognormal-loglinear model.

At block 92, the algorithm calculates a conditional risk associated with each particular failure mechanism using the risk analysis equations. The conditional risk is the probability that a unit parameter will reach or exceed a predetermined parameter limit at some point in the future. The predetermined parameter limit may be any condition, metric, measurement, or other criteria established by the user. For example, the predetermined parameter limit may be an operational limit, such as crack size, of a part or component which, if exceeded, may require action by the user, such as performing an additional inspection, removing the part or component from service, repairing the part or component, or limiting the operational capability of the gas turbine under service 10. The point in the future may be the next inspection interval for the gas turbine under service 10, measured chronologically, by operating hours, start-ups, shut-downs, unplanned trips, or any other exposure data provided by the user and associated with the failure mechanism.

At block 94, the algorithm calculates the reliability of the current condition in the gas turbine under service 10. The calculated reliability is the probability that a part or component will be able to successfully perform designed function(s) at rated limits at least until some point in the future. Stated differently, the calculated reliability is the probability that a part or component will not fail as a result of an identified failure mechanism before some point in the future. As with the conditional risk calculation, the point in the future may be the next inspection interval for the gas turbine under service 10, measured chronologically, by operating hours, start-ups, shut-downs, unplanned trips, or any other exposure data provided by the user and associated with the failure mechanism.

Figure 6:
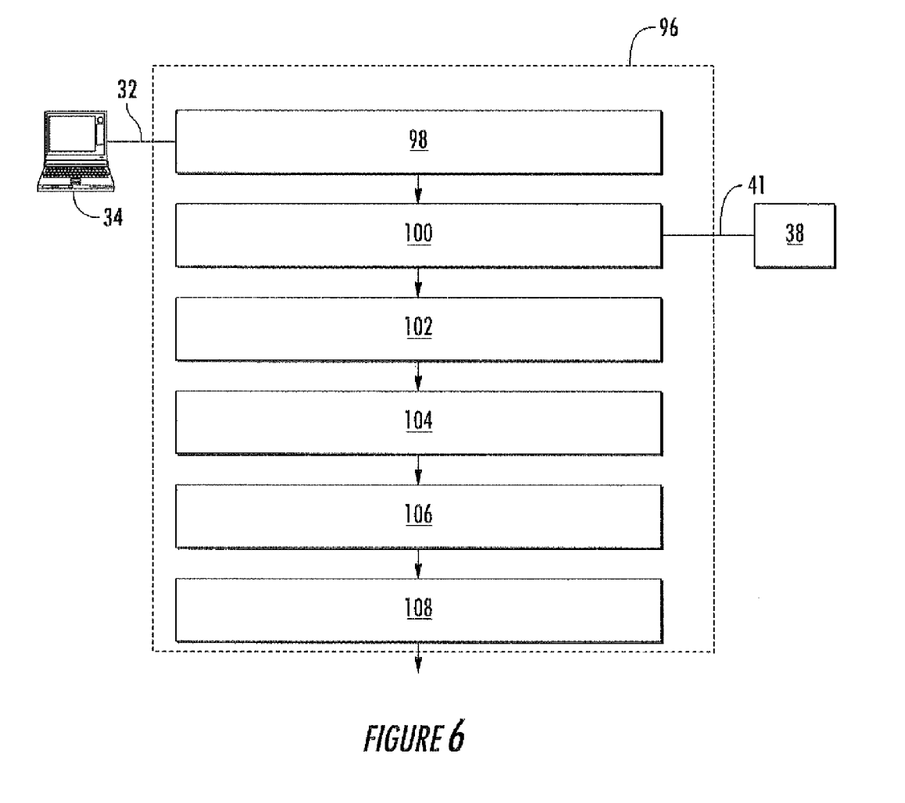
FIG. 6 shows an algorithm for calculating the remaining useful life for a part or component.

At block 96, the algorithm calculates the remaining useful life for the part or component, and FIG. 6 shows an algorithm for performing this calculation. At blocks 98 and 100, the algorithm imports the risk signal 32 and updated parameter information 41, respectively, as discussed previously with respect to blocks 86 and 88 in FIG. 5. At block 102, the algorithm calculates the mean damage value for each particular failure mechanism for the gas turbine under service 10. At block 104, the algorithm calculates the probability that the part or component will reach or exceed a predetermined operating limit at various future exposure points (e.g., operating hours, start-ups, shut-downs, unplanned trips, etc.). At block 106, the algorithm calculates the most limiting exposure point based on the acceptable risk level provided by the user for each failure mechanism. Using the data provided in the previous examples as an illustration, if the user provides an acceptable risk level of 5% for crack size, and the predetermined operational limit for crack size is 0.5, block 106 of the algorithm calculates the exposure point when the conditional risk is 5% that a crack size of 0.5 will exist. At block 108, the algorithm calculates the remaining useful life of the part or component based on the difference between the current exposure point and the most limiting exposure point calculated in block 106.

Returning to FIG. 5, the unit risk analysis algorithm generates the output signal 42 that reflects the results of the unit risk analysis. For example, the output signal 42 may include repair 44 and/or maintenance 46 schedules and/or a useful life projection for the gas turbine under service 10 or a component therein.

Figure 7:
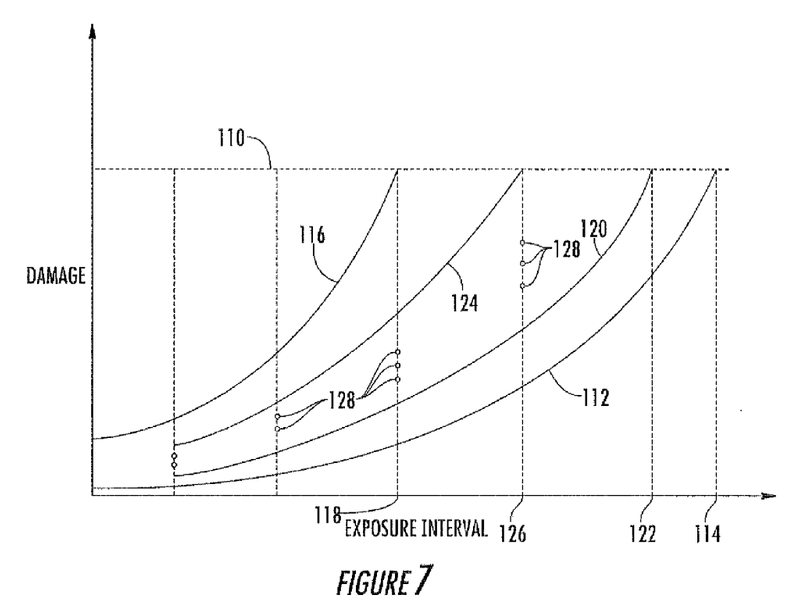
FIG. 7 graphically illustrates hypothetical damage propagation curves that may be generated by a unit risk analysis according to one embodiment of the present invention.

FIG. 7 graphically illustrates hypothetical damage propagation curves that may be generated by the unit risk analysis algorithm according to one embodiment of the present invention. The horizontal axis represents the exposure interval (e.g., the operating hours, start-ups, shut-downs, unplanned trips, or any other exposure data associated with a failure mechanism) between outages for repair and/or maintenance, and the vertical axis represents the amount of damage to a part or component in the gas turbine under service 10. A horizontal line across the graph represents the predetermined parameter limit 110 or operational limit of a part or component established by the user.

Each curve on the graph in FIG. 7 represents a hypothetical damage propagation curve. For example, the curve labeled 112 reflects a risk of 5%, according to the fleet model, that a part or component having no detected damage will exceed the predetermined parameter limit 110 before the exposure interval labeled 114. The curve labeled 116 reflects a risk of 95%, according to the fleet model, that a part or component having no detected damage will exceed the predetermined parameter limit 110 before the exposure interval labeled 118. The curve labeled 120 reflects a risk of 5%, according to the updated fleet model or unit model, that a part or component having no detected damage will exceed the predetermined parameter limit 110 before the exposure interval labeled 122. The curve labeled 124 reflects a risk of 95%, according to the updated fleet model or unit model, that a part or component having no detected damage will exceed the predetermined parameter limit 110 before the exposure interval labeled 126. The various data points labeled 128 represent actual inspection results, previously referred to variously as unit parameter information or damage data 72, communicated to the processor 22 through the unit data signal 30. Referring back to FIG. 2, this damage data 72 is added to the unit model in block 38 to generate the updated parameter information 41. The unit risk analysis combines the updated parameter information 41 with information in the risk signal 32 to determine the actual risk curve for the gas turbine under service 10.

Figure 8:
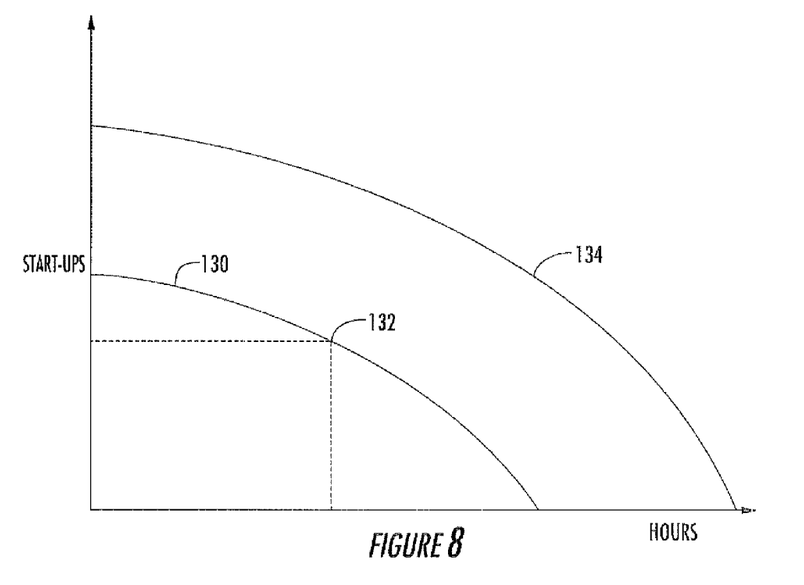
FIG. 8 graphically illustrates hypothetical useful life curves according to one embodiment of the present invention.

FIG. 8 graphically illustrates hypothetical useful life curves generated by the algorithm previously discussed with respect to FIG. 6. In this illustration, the horizontal axis represents the exposure limit of hours of operation, and the vertical axis represents the exposure limit for start-ups. Other exposure limits may be applicable, depending on various factors such as the failure mechanism, the particular part or component, the exposure data for the gas turbine under service 10, etc. The curve labeled 130 represents a hypothetical useful life curve for a part or component for a particular failure mechanism. Point 132 represents a designed useful life for a part or component for a given combination of start-ups and operating hours. The curve labeled 134 represents a new useful life curve for the part or component, as calculated by blocks 106 and 108 in FIG. 6. As shown, the new useful life curve 134 illustrates the increased number of start-ups and operating hours that the part or component may experience before the failure mechanism occurs.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for monitoring the performance of a gas turbine under service, comprising:
   a. a memory element containing a database of parameter information from comparable gas turbines;
   b. an input device, wherein the input device is configured to generate parameter information from the gas turbine under service and a risk value for the gas turbine under service;
   c. a processor in communication with the memory element and the input device, wherein the processor is configured to incorporate the parameter information from the gas turbine under service into the database of parameter information from comparable gas turbines, project parameter information for the gas turbine under service, and calculate a conditional risk that the projected parameter information for the gas turbine under service will reach a predetermined parameter limit; and
   d. wherein the processor is configured to generate at least one of repair or maintenance scheduling information.

2. The system as in claim 1, further comprising a fleet model in the database, wherein the fleet model includes parameter information from comparable gas turbines.

3. The system as in claim 1, wherein the database of parameter information from comparable gas turbines includes data reflecting at least one of operation, repairs, or maintenance of the comparable gas turbines.

4. The system as in claim 1, wherein the parameter information from the gas turbine under service includes data reflecting at least one of operation, repairs, or maintenance of the gas turbine under service.

5. The system as in claim 1, wherein the processor is configured to generate the at least one of repair or maintenance scheduling information based on a comparison of the conditional risk and the risk value.

6. The system as in claim 1, wherein the at least one of repair or maintenance scheduling information includes a projected useful life of a component in the gas turbine under service.

7. A computer-implemented method for monitoring the performance of a gas turbine under service, comprising:
   a. receiving parameter information from comparable gas turbines in a computing device;
   b. adding parameter information from the gas turbine under service to the parameter information from comparable gas turbines in the computing device;
   c. projecting parameter information for the gas turbine under service in the computing device;
   d. calculating with the computing device a conditional risk that the projected parameter information for the gas turbine under service will reach a predetermined parameter limit; and
   e. generating an output with the computing device, wherein the output contains at least one of a repair or a maintenance schedule for the gas turbine under service based on the conditional risk.

8. The method as in claim 7, further comprising comparing the conditional risk to a predetermined risk value in the computing device.

9. The method as in claim 8, further including delaying repair or maintenance if the conditional risk is less than the predetermined risk value.

10. The method as in claim 8, further including accelerating repair or maintenance if the conditional risk is not less than the predetermined risk value.

11. The method as in claim 8, further comprising generating a risk output in the computing device that contains the predetermined risk value.

12. The method as in claim 7, further including calculating a statistical accuracy of the projected parameter information for the gas turbine under service in the computing device.

13. The method as in claim 7, further comprising calculating a projected useful life of a component in the gas turbine under service in the computing device.

14. The method as in claim 7, further comprising receiving the parameter information from comparable gas turbines in the computing device from a database of parameter information of comparable gas turbines.

15. The method as in claim 7, further comprising generating parameter information from the gas turbine under service in the computing device.

16. A computer-implemented method for monitoring the performance of a gas turbine under service, comprising:
   a. receiving a fleet model containing parameter information from comparable gas turbines in a computing device;

b. adding parameter information from the gas turbine under service to the parameter information from comparable gas turbines in the computing device;

c. projecting parameter information for the gas turbine under service in the computing device;

d. calculating with the computing device a conditional risk that the projected parameter information for the gas turbine under service will reach a predetermined parameter limit; and e. generating an output with the computing device, wherein the output contains at least one of a repair schedule, a maintenance schedule, or a projected useful life for the gas turbine under service based on the conditional risk.

17. The method as in claim 16, further comprising comparing the conditional risk to a predetermined risk value in the computing device.

18. The method as in claim 17, further comprising generating the output with the computing device based on the predetermined risk value.

19. The method as in claim 16, further including calculating a statistical accuracy of the projected parameter information for the gas turbine under service in the computing device.

20. The method as in claim 16, further comprising generating the parameter information from the gas turbine under service in the computing device.

* * * * *